(12) United States Patent
Jähnig

(10) Patent No.: US 8,657,534 B2
(45) Date of Patent: Feb. 25, 2014

(54) FLOATING PLATFORM WITH IMPROVED ANCHORING

(75) Inventor: Jens Jähnig, Dorfhain (DE)

(73) Assignee: Gicon Windpower IP GmbH, Dresden (DE)

( * ) Notice: Subject to any disclaimer, the term of this patent is extended or adjusted under 35 U.S.C. 154(b) by 274 days.

(21) Appl. No.: 12/914,205

(22) Filed: Oct. 28, 2010

(65) Prior Publication Data

US 2011/0107953 A1    May 12, 2011

(51) Int. Cl.
*B63B 35/44* (2006.01)

(52) U.S. Cl.
USPC ........................................ 405/223.1; 405/224

(58) Field of Classification Search
USPC ............... 405/223.1, 224, 195.1; 114/266
See application file for complete search history.

(56) References Cited

U.S. PATENT DOCUMENTS

| | | | |
|---|---|---|---|
| 2,399,656 A | | 12/1944 | Armstrong |
| 3,082,608 A | * | 3/1963 | Daniell ........................ 405/224 |
| 3,086,368 A | | 4/1963 | Popper |
| 3,540,396 A | * | 11/1970 | Horton ........................ 114/265 |
| 3,988,898 A | * | 11/1976 | McDonald ................... 405/224 |
| 4,702,321 A | | 10/1987 | Horton |
| 6,352,116 B1 | * | 3/2002 | B.o slashed.rseth .......... 166/359 |
| 7,156,586 B2 | | 1/2007 | Nim |
| 2008/0089746 A1 | | 4/2008 | Jakubowski |
| 2008/0112759 A1 | * | 5/2008 | Hardison ...................... 405/25 |

FOREIGN PATENT DOCUMENTS

| | | |
|---|---|---|
| DE | 1431323 | 10/1969 |
| DE | 2054946 | 5/1971 |
| DE | 10056857 A1 | 7/2001 |
| EP | 0311397 A1 | 4/1989 |
| EP | 1288122 A3 | 3/2003 |
| EP | 1876093 A1 | 1/2008 |
| GB | 1293668 | 10/1972 |
| GB | 2378679 B | 2/2003 |
| WO | 9855355 A1 | 12/1998 |
| WO | 2004079146 A2 | 9/2004 |
| WO | 2006038091 A2 | 4/2006 |
| WO | 2007/014670 A1 | 2/2007 |

* cited by examiner

*Primary Examiner* — John Kreck
*Assistant Examiner* — Jessica H Lutz
(74) *Attorney, Agent, or Firm* — Michael Soderman

(57) ABSTRACT

The floating platform (2) according to the invention is provided with anchors (9-11) which are arranged vertically below connecting locations (20, 21, 22) on a floating support structure (7). Mooring cables (26, 27, 28) extend from each anchor (9-11) vertically upward to corresponding connecting locations while other mooring cables (29) to (34) extend at an angle upward to connecting locations arranged beyond the center (19). As a result, a stable floating platform with high load-carrying capacity is obtained.

8 Claims, 3 Drawing Sheets

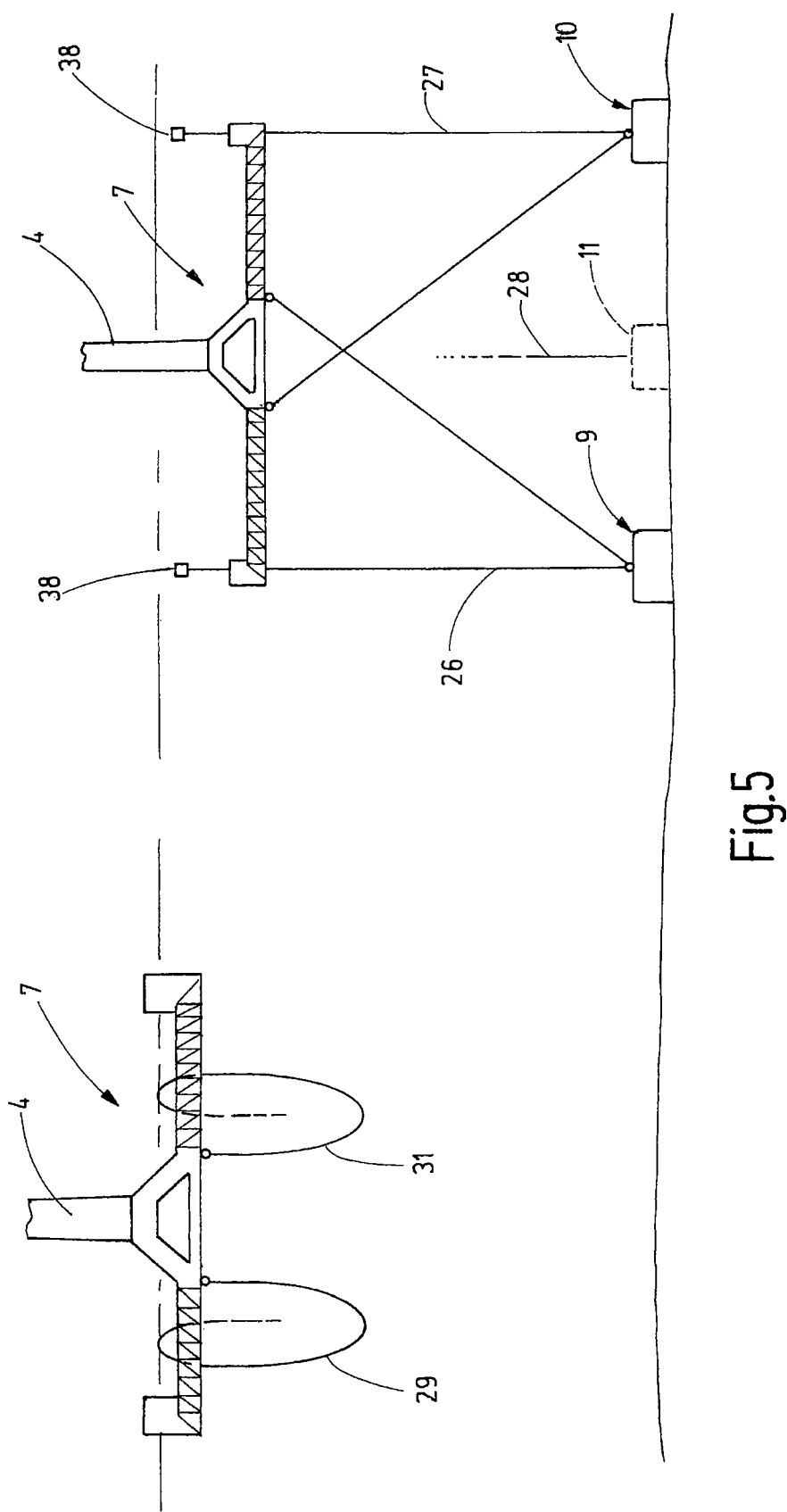

FLOATING PLATFORM WITH IMPROVED ANCHORING

BACKGROUND OF THE INVENTION

The invention relates to a floating platform for off-shore structures, in particular for wind turbines.

Structures to be erected off shore require a foundation which is stable and is able to take loads. In the process, considerable loads caused by water currents, wave movements, as well as the wind must be taken into consideration.

The document GB 2378679, for example, discloses a floating support structure for a wind turbine. The floating support structure comprises several floats which are submerged during the operation. These floats are connected by means of a support frame, with the tower for the wind turbine arranged in the center thereof. For the anchoring, suction anchors are provided to which the floating support structure is connected via mooring cables extending substantially perpendicular from the floats to the suction anchors.

A floating support structure for a wind turbine is also disclosed in the document U.S. Pat. No. 7,156,586 B2, wherein the floating support structure is provided with floats connected via mooring cables to anchors provided on the ocean floor. The mooring cables in this case also extend substantially perpendicular.

The document EP 1 288 122 A2 discloses a different floating support structure which is held in place by mooring cables extending to the ocean floor. The mooring cables are attached to the outer ends of the floating support structure and from there extend downward in vertical direction or sloping toward the outside. As a result of the sloped stay cables, the floating support structure is stabilized to some degree to counter floating movements of the support structure toward the side.

The floating support structure disclosed in the document EP 1 876 093 A1 is a composite construction, consisting of hollow concrete bodies and steel bodies. This support structure is anchored with the aid of mooring cables, extending vertically downward to anchors, wherein the cables are attached on the outside of the floating support structure, below its floats.

The document DE 10 2005 036 679 A1 discloses a different floating support structure, comprising submerged floats and mooring cables for anchoring the floating support structure on ballast bodies. The mooring cables essentially extend vertically downward from the floats, respectively are sloped toward the outside.

The document DE 100 56 857 A1 directs special attention to the anchoring of a float in the form of a support buoy. Attached to the outer periphery of the floats are mooring cables which extend downward and outward at a slope from the float and are attached to ram pile anchors or also to ram pile anchors and ballast bodies.

A similar anchoring method with sloped cables is known from the US document 3,082,608 A. The floating support structure described therein is connected via chains, extending outward and downward at a slope, to respective anchors which are arranged on the ocean floor.

In a similar manner, the document U.S. Pat. No. 4,702,321 shows an attempt to connect a floating oil platform with the aid of sloped mooring cables to ram pile anchors.

Starting with this prior art, it is the object of the present invention to create a floating support structure with improved anchoring.

SUMMARY OF THE INVENTION

This object is solved with the floating platform according to claim 1:

The floating platform according to the invention comprises a floating support structure with several horizontally spaced apart connecting locations from which anchoring means, for example mooring cables, extend which connect the floating support structure to several anchors. These anchors are arranged locally fixed and horizontally spaced apart on the ocean floor. The anchors are preferably ballast bodies, meaning so-called gravity foundations.

At least some of the anchoring means respectively connect an anchor, which is essentially arranged below a connecting location, to a connecting location that is arranged at a distance thereto. With respect to its shape and dimensions, the polygon formed by the anchors thus matches a polygon defined by the connecting locations.

At least some of the connecting locations are respectively connected to anchors positioned at a far distance. The floating support structure has a center from which a tower, for example belonging to the wind turbine, projects upward. The present anchoring concept provides that at least some of the connecting locations are arranged along the periphery of the floating support structure. In the same way, the anchors are preferably arranged below the periphery of the floating support structure. At least some of the anchoring means, for example the mooring cables, extend from a connecting location on the floating support structure to an anchor which is located beyond the center of the floating support structure. This anchor is referred to as "remotely positioned" anchor. This anchoring concept permits an especially rigid positioning or anchoring of the floating support structure.

The gradient angle for the sloped cables is thus minimized. At the same time, the area encompassed or defined on the ocean floor by the anchors is delimited to the same dimensions as the area required for the floating support structure. As a result, adjacent floating support structures can be erected relatively close to each other. In addition and as a result of the fact that mooring cables or other types of anchoring means are respectively guided to the anchor positioned "on the other side," a favorable support is obtained for staying wind loads whenever the structure is subjected to wind drag or wind loads. The tower surges, caused by wind and other weather conditions, by flows and other types of loads, can thus be minimized for the most part. Floating movements toward the side can also be minimized, thereby making it possible to maintain relatively precise distances between adjacent structures.

The connecting locations on the floating support structure are advantageously arranged at the corners of a polygon. In the simplest case, the polygon can be a triangle. The floating support structure is provided, for example, with inner and outer connecting locations. The outer connecting locations are preferably arranged vertically above the anchor and are again advantageously positioned on floats arranged in radial direction on the outer ends of extension arms on the floating support structure. Inner connecting locations are arranged, for example, at those locations where the radially outward extending arms of the floating support structure, for example embodied as braced girders, adjoin an inner three-dimensional framework, for example taking form of a tetrahedron.

At least two anchoring means preferably extend away from each anchor, wherein one advantageously extends vertically upward while the other one extends at an angle to a connecting location which is positioned at a distance thereto, meaning to a connecting location on the other side of the center of the floating support structure. Additional anchoring means can be provided which extend to other, far removed connecting locations. In that case, two sloped anchoring means preferably extend at the same gradient angle away from the anchor, as well as a vertical anchoring means. This type of design has the additional advantage that the structure is also secured against rotation or torsional vibrations around a vertical axis of rotation.

It is advantageous if only sloped anchoring means extend downward from the radially inner connecting locations on the floating support structure while respectively at least one anchoring means extends vertically downward from the radially outer connecting locations. It is preferable if only vertical anchoring means extend from the outer connecting locations. In that case, climbing devices can be provided at the outer connecting locations which make it possible to move the structure up and down along the vertical anchoring means. The climbing devices can comprise clamps and traversing mechanisms, wherein these can preferably be operated hydraulically. For one preferred embodiment, the upper end of each vertically arranged anchoring means is connected to a separate float which holds in place the upper end of the anchoring means, so as to be stretched tight in upward direction, regardless of the effect of the floating support structure.

BRIEF DESCRIPTION OF THE DRAWINGS

Further details of advantageous embodiments of the invention are the subject matter of the description, or the drawing, or the claims. The description is limited to essential aspects of the invention and other facts. Shown are in:

FIG. 5 The process of erecting the floating platform, showing two different stages in a schematic representation.

DETAILED DESCRIPTION OF THE INVENTION

Figure 1:
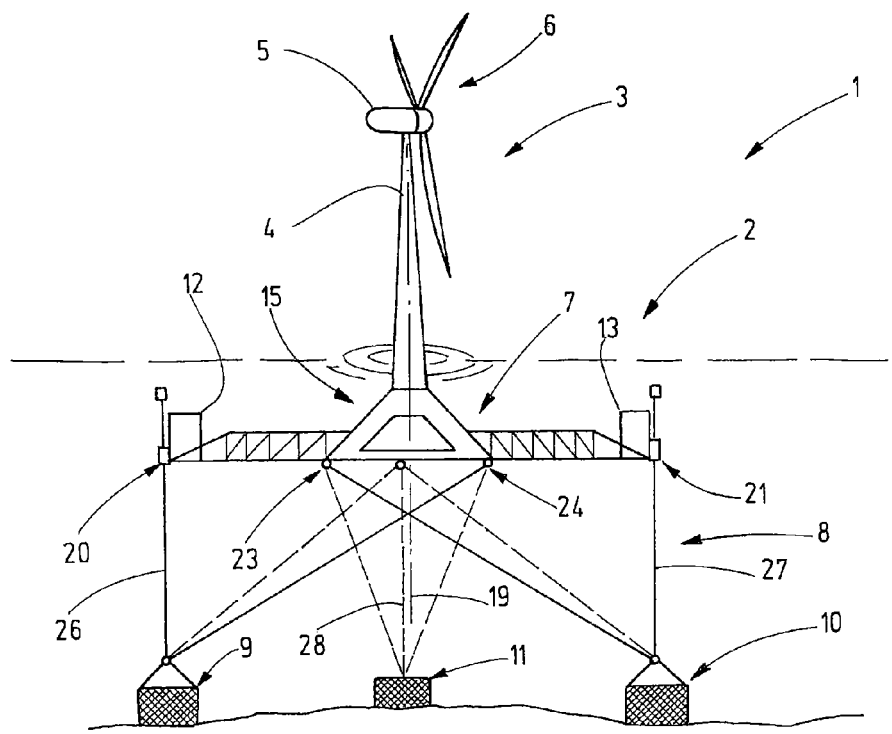
FIG. 1 A floating platform according to the invention, shown in a schematic and in part simplified view from the side.
Figure 2:
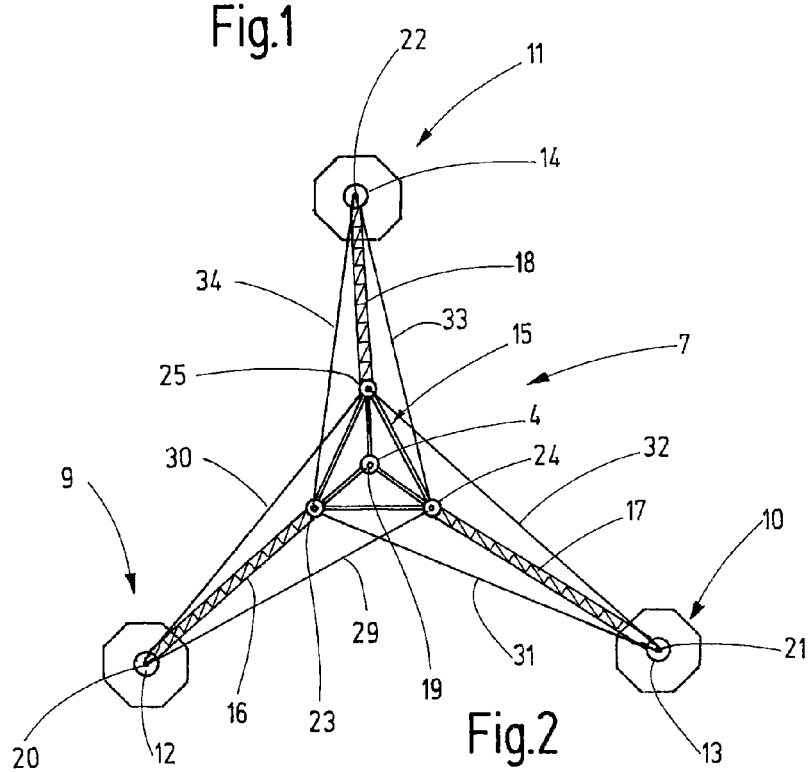
FIG. 2 The floating platform according to FIG. 1, shown in a simplified view and as seen from above.

FIG. 1 illustrates an off-shore structure 1 in the form of a wind turbine 3 that is supported on a floating platform 2 and comprises a tower 4, a gondola 5 and a rotor 6. The lower end of the tower 4 is connected to a floating support structure 7 which forms a floating platform together with the anchoring means 8 and the anchors 9, 10, 11. As can be seen in FIG. 2, the anchors 9, 10, 11 are arranged horizontally spaced apart on the ocean floor, at the corners of a preferably equilateral triangle. The anchors 9, 10, 11 are preferably ballast bodies for which the weight clearly exceeds the buoyancy of the floating support structure.

The floating platform 7 advantageously is a composite steel and concrete structure and comprises several floats 12, 13, 14 which are arranged at the outer periphery of the floating support structure 7. The floating support structure 7 comprises, for example, horizontal extension arms 16, 17, 18, extending radially outward from a centrally arranged three-dimensional support structure 15, wherein these extension arms are positioned approximately horizontal during the operation and connect the floats 12, 13, 14 to the three-dimensional support structure 15 which can be tetrahedral-shaped. The extension arms 16, 17, 18 can be embodied as braced girders. The mast 4 is positioned on the upper end of the three-dimensional support structure 15, wherein this location marks the center 19 of the floating support structure 7.

Radially outer connecting locations 20, 21, 22 with thereon mounted anchoring means 8 are arranged in radial direction on the outside, either in, on, below or directly adjacent to the floats 12, 13, 14. The floating support structure 7 is provided with further connecting locations 23, 24, 25 which can be arranged somewhat further toward the inside in radial direction. For example, they are arranged below the connecting locations where the extension arms 16, 17, 18 adjoin the three-dimensional support structure 15. The connecting locations 23, 24, 25, however, can also be arranged further toward the outside in radial direction or, in extreme cases, at the extreme outer ends in radial direction. The connecting location 23, for example, can be arranged directly at or joined with the connecting location 20. The same is true for the other connecting locations.

The anchoring means 8 comprise anchoring devices which are arranged vertically or at a gradient, wherein these are steel cables for the present exemplary embodiment. A steel cable 26, 27, 28 extends from each outer connecting location 20, 21, 22 vertically downward to the anchor 9-11 which is arranged directly below. The vertical mooring cables 26, 27, 28 keep the floating platform 7 in place below the ocean surface, counter to its buoyancy. In place of the steel cables, however, other suitable anchoring means such as chains can also be used.

Figure 3:
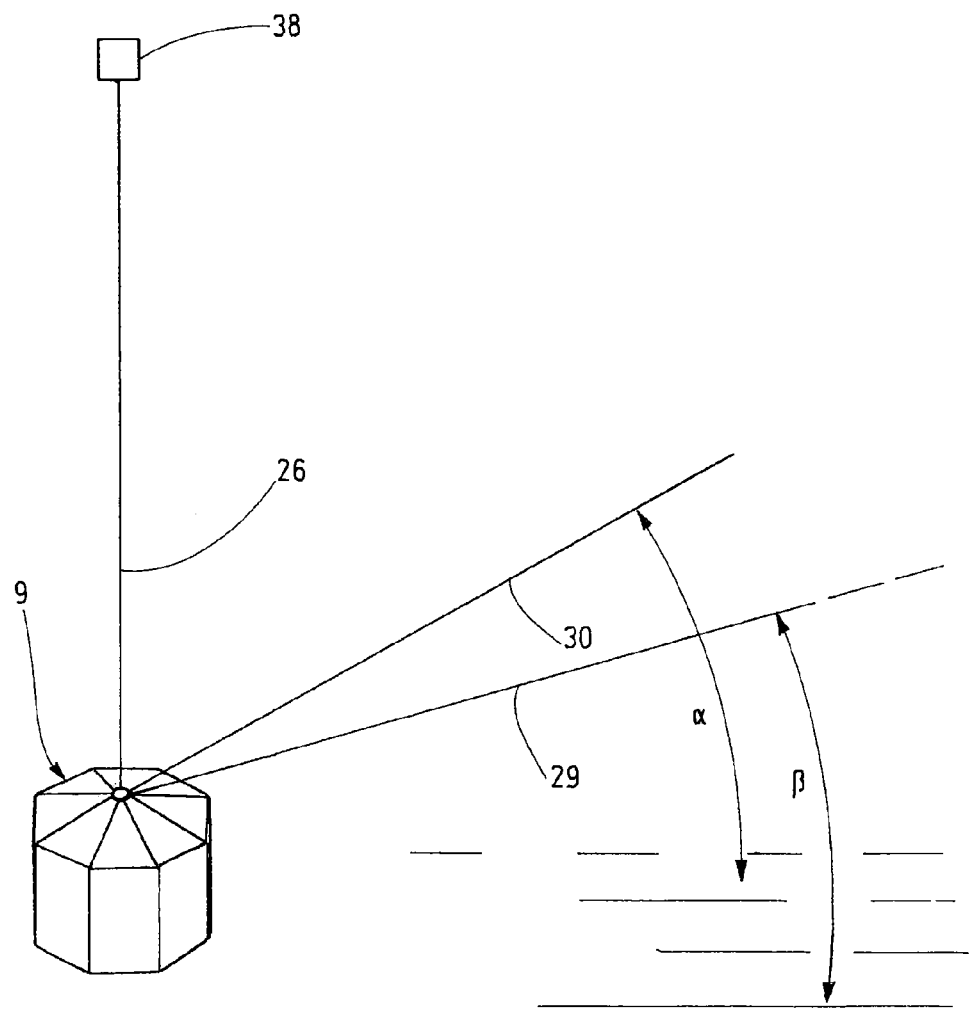
FIG. 3 Anchor and mooring cables for the floating platform according to FIGS. 1 and 2.

At least one but preferably several, for example two, mooring cables 29, 30 extend from the anchor 9 to the radially inward positioned connecting locations 24, 25 which, however, are positioned at a distance as seen from the anchor 9. These locations are beyond the center 19 as seen from the anchor 9. FIG. 3 shows that the two mooring cables 29, 30 respectively enclose a gradient angle $\alpha$, $\beta$ with the ocean floor, wherein the two gradient angles $\alpha$ and $\beta$ are identical. In addition, the mooring cables 29, 30 together enclose an acute angle.

In a similar manner, two mooring cables 31, 32 extend from the anchor 10 to the connecting locations 23 and 25, wherein these are beyond the center 19 as seen from the anchor 10. Two mooring cables 33, 34, in turn, extend from the anchor 11 to the connecting locations 23, 24 which are also located beyond the center 19 as seen from the anchor 11.

The concept presented herein provides a high location stability and load-bearing capacity while using a small installation surface for the floating foundation 2. Wind loads acting upon the rotor result in the introduction of a moment into the floating support structure 7. As a result of the sloped mooring cables 29 to 34, the floating foundation is held such that the buoyancy of the floats 12, 13, 14 quite effectively counters this moment acting upon the floating support structure 7.

The anchors 9-11 are preferably heavy weight anchors which consist of a concrete body, if applicable encased by steel, or a steel-reinforced concrete body. The concrete body for one preferred embodiment is produced on location by using sea gravel and sea water as mixing water. The weight force generated by the anchors 9-11 far exceeds the buoyancy of the floating support structure 7. The mooring cables 26, 27, 28 transmit the required anchoring force for keeping the floating support structure 7 below the water level. The sloped mooring cables 29 to 34 prevent a tilting of the structure. The connecting locations 23, 24, 25 are advantageously passive connecting locations to which the mooring cables 29 to 34 are fixedly connected in axial direction. However, they can also be provided with adjustment devices, so that the cables can be tensioned as desired.

Figure 4:
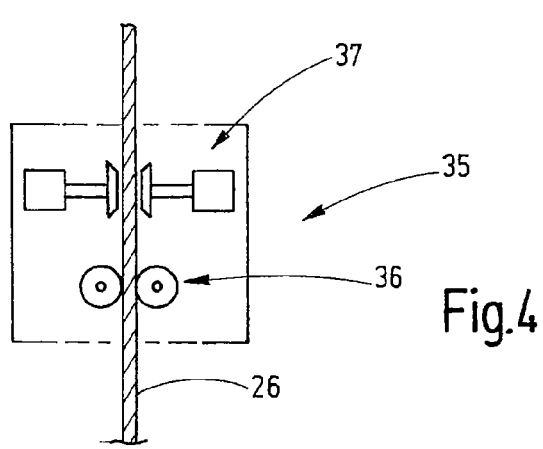
FIG. 4 A climbing device for the floating platform, shown in a schematic basic representation.

The outer connecting locations 20, 21, 22, which are intended for accommodating the vertical mooring cables 26, 27, 28, are embodied differently. They can be provided with a climbing device, as shown schematically in FIG. 4 in the form of the climbing device 35. The climbing device 35 can serve to adjust the vertical position of the respective connecting location 20, 21, 22 on the respective cable 26, 27, 28. The climbing device 35 advantageously contains means 36 for moving the connecting location along the mooring cable 26, as well as means 37 for stopping and locking it in place in a desired vertical position. The traversing means 36 can include, for example, two or more pulleys, at least one of which is driven, for clamping in the mooring cable 26 between them. The clamping means 37 can comprise one or several brake clips which can be tensioned against the mooring cable 26 with the aid of suitable activation means, for example hydraulic cylinders, so as to clamp in the cable between them.

The floating platform 2 described in this way can be erected easily:

The pre-mounted floating support structure 7, as indicated on the left side of FIG. 5, is initially towed to the desired installation location, for example with the aid of a towboat. Following this, the anchors 9-11 are installed. The vertically extending mooring cables 26 to 28 can initially be attached to the anchors 9-11 by connecting them with their respective upper ends to a float 38. The length of these vertical mooring cables 26 to 28 is such that the float 38 is located below the water surface. The float 38 is preferably relatively small, wherein it is designed to just barely support the weight of the mooring cable 26 to 28.

The sloped mooring cables can already be connected to the floating support structure 7, wherein their ends assigned to the anchors 9-11 can still be suspended from the floating support structure 7, as shown schematically on the left in FIG. 5.

Once the floating support structure 7 has arrived at the installation location, the vertical mooring cables 26, 27, 28 are connected to the climbing devices 35, meaning to the connecting locations 20, 21, 22. The floating support structure 7 can then be lowered with the aid of the climbing device 35. Initially, the support structure can be moved far enough down, so that the sloped mooring cables can be attached easily to the anchors 9, 10, 11. Following this, the floating support structure 7 can be moved up again far enough, so that the sloped mooring cables are maintained with tight tension.

The floating platform 2 according to the invention is provided with anchors 9-11 which are arranged vertically below the connecting locations 20, 21, 22 of a floating support structure 7. Mooring cables 26, 27, 28 extend vertically upward from each anchor 9-11 to the respective connecting locations while other mooring cables 29 to 34 extend upward at an angle to respective connecting locations beyond the center 19. This results in a stable floating plafform with high load-bearing capacity.

REFERENCE NUMBERS 1 structure
2 floating platform
3 wind turbine
4 tower
5 gondola
6 rotor
7 floating support structure
8 anchoring means
9,10,11 anchor
12,13,14 floats
15 three-dimensional support structure
16,17,18 extension arms
19 center
20-25 connecting locations
26-28 vertical mooring cables
29, 30 mooring cables
α, β gradient angle
31-34 mooring cables
35 climbing device
36 traversing mechanism
37 clamping means

The invention claimed is:

1. A floating platform for off-shore supported wind turbines comprising
 a floating support structure below the ocean surface, the floating support structure defining a horizontal plane,
 said floating support structure having a center, a plurality of floats spaced radially outwardly from the center and located on the horizontal plane of said floating support structure, and a plurality of first connecting locations and a plurality of second connecting locations horizontally spaced apart on said floating support structure, wherein
 each said float is provided with at least one of said first connecting locations, said second connecting locations are spaced radially apart from the center and affixed to the floating support structure along each line formed between the floats and the center, and wherein
 a plurality of anchors are horizontally spaced apart from one another and arranged so as to be in a fixed location that is below the horizontal plane defined by said floating support structure, and
 a plurality of anchoring means are provided for anchoring said structure to said anchors, wherein each one of said anchors is provided with a pair of anchoring means, wherein each one of said pair of anchoring means obliquely leads to a different one of said second connecting locations and each anchor is additionally provided with a vertically oriented anchoring means connected to one of said first connecting locations associated with one of said floats on said floating support structure,
 whereby the structure is secured against rotation or torsional vibrations around a vertical axis of rotation.

2. The floating platform according to claim 1, wherein the plurality of second connecting locations are arranged so as to define the corners of a polygon.

3. The floating platform according to claim 1, wherein in said pairs of anchoring means one of said anchoring means extends with a coinciding gradient angle to one of said second connection locations and the other said anchoring means extends with a coincident angle to another of said second connection locations.

4. The floating platform according to claim 3, wherein in said pairs of anchoring means the anchoring means have different gradient angles.

5. The floating platform according to claim 3, wherein in said pairs of anchoring means the gradient angles are the same.

6. The floating platform according to claim 1, wherein each float is vertically associated with an anchor, and said vertically oriented anchoring means has an upper end which can be connected to an associated float that supports the associated anchoring means.

7. The floating platform according to claim 1, wherein said floating platform has a central area, and includes a wind turbine having a base thereof mounted in the central area wherein when installed in the ocean so said wind turbine has a turbine portion thereof extending vertically above the ocean surface.

8. The floating platform according to claim 1, wherein said pairs of anchoring means lead to second connecting locations beyond a central axis extending through the center and perpendicular to the horizontal floating support structure and wherein said pairs of anchoring means extend on either side of the central axis so that the central axis is between the pair of anchoring means.

\* \* \* \* \*